US010738579B2

(12) United States Patent
Batarseh et al.

(10) Patent No.: US 10,738,579 B2
(45) Date of Patent: Aug. 11, 2020

(54) METHODS OF USING A LASER-INDUCED PLASMA TOOL

(71) Applicant: Saudi Arabian Oil Company, Dhahran (SA)

(72) Inventors: Sameeh Issa Batarseh, Dhahran (SA); Damian Pablo San Roman Alerigi, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/138,525

(22) Filed: Sep. 21, 2018

(65) Prior Publication Data

US 2020/0032634 A1     Jan. 30, 2020

Related U.S. Application Data

(60) Provisional application No. 62/711,237, filed on Jul. 27, 2018.

(51) Int. Cl.
*E21B 43/26*   (2006.01)
*E21B 28/00*   (2006.01)
*E21B 47/00*   (2012.01)
*E21B 47/024*  (2006.01)
*G02B 6/42*    (2006.01)
(Continued)

(52) U.S. Cl.
CPC .............. *E21B 43/26* (2013.01); *E21B 28/00* (2013.01); *E21B 43/003* (2013.01); *E21B 47/00* (2013.01); *E21B 47/024* (2013.01); *G02B 6/4206* (2013.01); *G02B 6/4296* (2013.01); *H05H 1/48* (2013.01)

(58) Field of Classification Search
CPC .......... E21B 43/26; E21B 43/003; H05H 1/48
See application file for complete search history.

(56) References Cited

U.S. PATENT DOCUMENTS 4,479,680 A    10/1984  Wesley et al.
5,106,164 A *   4/1992  Kitzinger ................ E21B 7/007
                                                    166/63
5,356,081 A    10/1994  Sellar
(Continued)

OTHER PUBLICATIONS

Aarts, A. C. T. and Odms, G. Net flow of compressible viscous liquids induced by travelling waves in porous media, Journal of Engineering Mathematics, 34(4): 435-450 (1998).
(Continued)

*Primary Examiner* — James G Sayre
(74) *Attorney, Agent, or Firm* — Choate, Hall & Stewart LLP; Charles E. Lyon; Alexander D. Augst

(57) ABSTRACT

An example method includes stimulating a wellbore using a plasma tool configured to operate in the wellbore. The method includes introducing the plasma tool into the wellbore and generating one or more first laser beams. The method includes directing the one or more first laser beams to one or more first points outside of the downhole unit and inside a volume of fluid at least partially confined by an acoustic mirror. The one or more first laser beams may create a plasma bubble at a first point resulting in one or more shock waves in the volume of fluid. The method includes deforming the acoustic mirror to produce, from the one or more shock waves, one or more destructive reflected waves directed to one or more second points outside of the downhole unit.

19 Claims, 4 Drawing Sheets

(51) Int. Cl.
  *E21B 43/00* (2006.01)
  *H05H 1/48* (2006.01)

(56) References Cited

U.S. PATENT DOCUMENTS

| | | | |
|---|---|---|---|
| 7,270,195 | B2 | 9/2007 | MacGregor et al. |
| 7,416,032 | B2 | 8/2008 | Moeny et al. |
| 7,530,406 | B2 | 5/2009 | Moeny et al. |
| 9,057,232 | B2 | 6/2015 | Cioanta et al. |
| 9,840,313 | B2 | 12/2017 | Cioanta et al. |
| 10,030,505 | B1 | 7/2018 | Toniolo et al. |
| 2006/0231257 | A1 | 10/2006 | Reed et al. |
| 2009/0126235 | A1 | 5/2009 | Kobayashi et al. |
| 2010/0326659 | A1 | 12/2010 | Schultz et al. |
| 2013/0062514 | A1 | 3/2013 | Csutak |
| 2013/0081874 | A1* | 4/2013 | Gutsol ............... E21B 7/15 175/1 |
| 2014/0305877 | A1* | 10/2014 | Cioanta ........... E21B 28/00 210/739 |
| 2017/0036923 | A1* | 2/2017 | Cioanta ........... B01D 9/0004 |
| 2019/0093457 | A1* | 3/2019 | Eng ................ E21B 28/00 |
| 2019/0100981 | A1* | 4/2019 | Fensky ............. E21B 37/00 |
| 2020/0032635 | A1 | 1/2020 | San Roman Alerigi et al. |

OTHER PUBLICATIONS

Boustie, M. et al., Laser Shock Waves: Fundamentals and Applications, in Proceedings of the 1st International Symposium on Laser Ultrasonics: Science, Technology and Applications, Montreal 6 pages (2008).

Chen, H. et al., Transformation optics and metamaterials, Nature Materials, 9(5): 387-396 (2010).

Clauer, A.H. and Holbrook, J.H., Effects of Laser Induced Shock Waves on Metals, Shock Waves and High-Strain-Rate Phenomena in Metals, Chapter 38: 675-703 (1981).

Fabbro, R. et al., Planar laser-driven ablation: Effect of inhibited electron thermal conduction, Physics of Fluids, 28(5): 1463 (1985).

Giacco, F. et al., Dynamic Weakening by Acoustic Fluidization during Stick-Slip Motion, Physical Review Letters, 115(12): 1-5 (2015).

Hamelin, M. et al., Hard rock fragmentation with pulsed power, 9th IEEE International Pulsed Power Conference (1993).

Leonhardt, U. and Philbin, T., Transformation Optics and the geometry of light, Progress in Optics, 53: 69-152 (2009).

Peyre, P. and Fabbro, R., Laser shock processing: A review of the physics and applications, Optical and Quantum Electronics, 27: 1213-1229 (1995).

San-Roman-Alerigi, D.P. et al., Electron irradiation induced reduction of permittivity in chalcogenide glass (As2S3) thin film, Journal of Applied Physics, 113(4): 044116 (2013).

San-Roman-Alerigi, D.P. et al., Generation of J0-Bessel-Gauss beam by a heterogeneous refractive index map, Journal of the Optical Society of America A, 29(7): 1252-1258 (2012).

Steverding, B. and Dudel, H. P., Laser-induced shocks and their capability to produce fracture, Journal of Applied Physics, 47(5): 1940-1945 (1976).

International Search Report for PCT/IB2018/057337, 5 pages (dated Apr. 15, 2019).

Written Opinion for PCT/IB2018/057337, 7 pages (dated Apr. 15, 2019).

\* cited by examiner

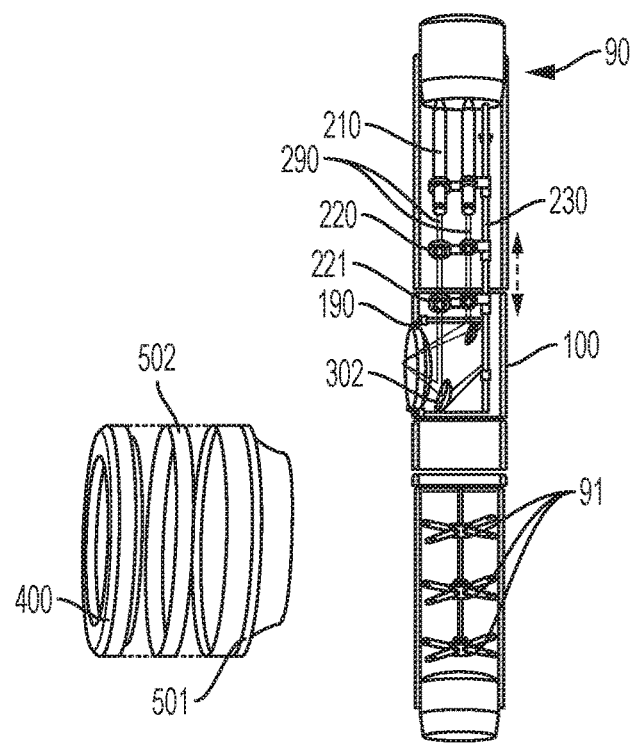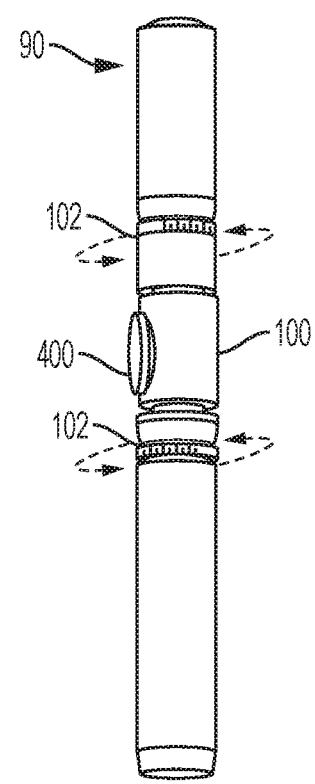
FIG. 2A  FIG. 2B
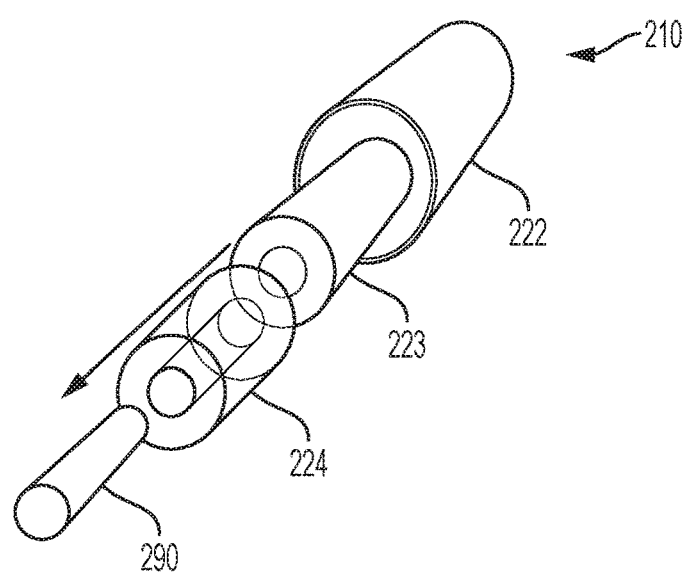
FIG. 3

US 10,738,579 B2

METHODS OF USING A LASER-INDUCED PLASMA TOOL

RELATED APPLICATIONS

This Application claims benefit of U.S. Provisional Patent Application Ser. No. 62/711,237, filed Jul. 27, 2018, entitled "LASER-INDUCED PLASMA TOOL," the disclosure of which is incorporated herein by reference in its entirety.

TECHNICAL FIELD

This specification describes an example laser-induced plasma tool for use in wellbores through rock formations.

BACKGROUND

In the oil and gas industry, a well may require intervention. Intervention may be performed to stimulate or to increase the flow of hydrocarbons from a surrounding rock formation into the well. Various techniques exist for well stimulation, including fracturing. Hydraulic fracturing is a type of fracturing. In hydraulic fracturing, fluid is injected into a well under pressure, creating cracks in the rock formation through which oil or gas may flow. Hydraulic fracturing is generally carried-out under controlled conditions and may involve monitoring the fracture environment and manipulating fluid properties in the wellbore.

SUMMARY

An example method includes stimulating a wellbore using a plasma tool configured to operate in the wellbore. The method includes introducing the plasma tool into the wellbore and generating one or more first laser beams. The method includes directing the one or more first laser beams to one or more first laser points outside of the downhole unit and inside a volume of fluid at least partially confined by an acoustic mirror. The one or more first laser beams may create a plasma bubble at a first laser point resulting in one or more shock waves in the volume of fluid. The method includes deforming the acoustic mirror to produce, from the one or more shock waves, one or more destructive reflected waves directed to one or more first target points outside of the downhole unit. The method may include one or more of the following features either alone or in combination.

The one or more first target points may be inside the volume of fluid at least partially confined by the acoustic mirror and at a distance from a wall of the wellbore. The one or more first target points may be inside the volume of fluid at least partially confined by the acoustic mirror and may be on a fluid-rock interface on a wall of the wellbore. The one or more first target points may be inside a cavity in a wall of the wellbore. The method may include causing the one or more first laser beams to split to create two or more plasma bubbles at two or more first laser points resulting in two or more shock waves.

The method may include causing the laser beam transformer to rotate from a first position to a second position. The method may include directing the one or more first laser beams to one or more second laser points outside of the downhole unit an inside a volume of fluid at least partially confined by the acoustic mirror. The one or more first laser beams may create a plasma bubble at the one or more second laser points resulting in one or more second shock waves in the volume of fluid. The method includes deforming the acoustic mirror to produce, from the one or more second shock waves, one or more destructive reflected waves directed to one or more second target points outside of the downhole unit.

Directing the one or more first laser beams may be performed by rotating a laser head comprising a laser beam transformer. The one or more first target points and the one or more second target points may be in a same position relative to a wall of the wellbore. The one or more first target points and the one or more second target points may be in different positions relative to a wall of the wellbore. The one or more first target points and the one or more second target points may be inside the volume of fluid at least partially confined by the acoustic mirror and at a distance from the wall of the wellbore.

The method may include generating one or more second laser beams and transmitting the one or more second laser beams to the laser beam transformer. The method may include directing the one or more second laser beams, using the laser beam transformer, to one or more third laser points outside of the downhole unit. The one or more third laser points may be on a wall of the wellbore. The one or more second laser beams may be configured to cause an increase in temperature in the wall of the wellbore.

The one or more first laser beams may be pulsed laser beams and the one or more second laser beams may be continuous wave laser beams. The one or more first laser beams may be continuous wave laser beams and the one or more second laser beams may be pulsed laser beams.

The one or more first target points may be inside the volume of fluid at least partially confined by the deformable acoustic mirror and at a distance from a wall of the wellbore, and the one or more third laser points may be on a wall of the wellbore. The one or more first target points may be inside the volume of fluid at least partially confined by the deformable acoustic mirror and may be on a fluid-rock interface on a wall of the wellbore, and the one or more third laser points may be on a wall of the wellbore. The one or more first target points may be inside a cavity in a wall of the wellbore, and the one or more third laser points may be on a wall of the wellbore. The method may include causing the one or more first laser beams to split to create two or more plasma bubbles at two or more first laser points resulting in two or more shock waves. The one or more third laser points may be on a wall of the wellbore and the one or more second laser beams may be configured to cause an increase in temperature in the wall of the wellbore.

Any two or more of the features described in this specification, including in this summary section, may be combined to form implementations not specifically described in this specification.

At least part of the processes and systems described in this specification may be controlled by executing on one or more processing devices instructions that are stored on one or more non-transitory machine-readable storage media. Examples of non-transitory machine-readable storage media include but are not limited to read-only memory, an optical disk drive, memory disk drive, and random access memory. At least part of the processes and systems described in this specification may be controlled using a computing system comprised of one or more processing devices and memory storing instructions that are executable by the one or more processing devices to perform various control operations.

The details of one or more implementations are set forth in the accompanying drawings and the description. Other features and advantages will be apparent from the description and drawings, and from the claims.

DESCRIPTION OF THE DRAWINGS

FIG. 2A is a cut-away side view of an example laser-induced plasma tool.

FIG. 2B is a perspective view of an example laser-induced plasma tool.

FIG. 3 is a perspective, exploded view of an example fiber optic cable.

Like reference numerals in different figures indicate like elements.

DETAILED DESCRIPTION

This specification describes example laser-induced plasma tools that may be used alone or in combination with an existing well infrastructure. An example laser-induced plasma tool includes a laser beam generator to generate a laser beam and optics to direct the laser beam to locations within a wellbore. For example, the laser beam may be directed to a wall of the wellbore or to a fluid in the wellbore, such as fluid within fractures in the wellbore. The energy imparted by the laser beam causes shock waves within the wellbore. For example, the shock waves may be induced within the fluid. The shock waves may propagate throughout fractures containing fluid, which may cause additional fracturing of rock surrounding the wellbore. The resulting additional fractures may enable the release or flow of hydrocarbons into the wellbore. The example tool may be used with oil wells or other hydrocarbon-producing wells.

Figure 1A:
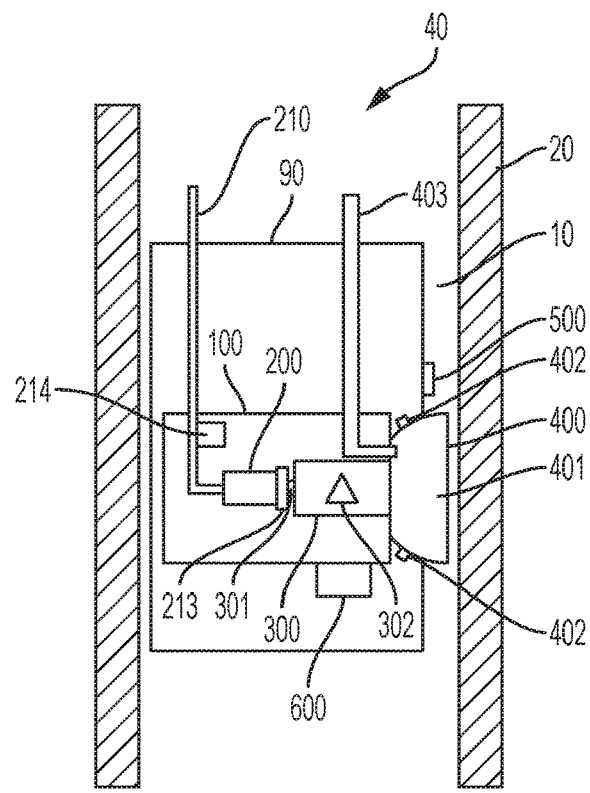
FIGS. 1A and 1B are cut-away side views of an example laser-induced plasma tool in a wellbore.
Figure 1B:
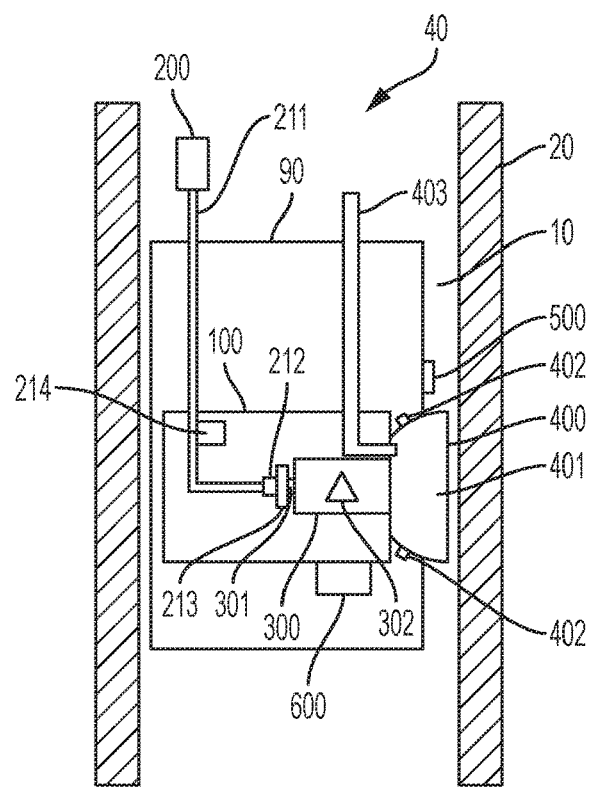

Referring to FIGS. 1A and 1B, components of an example laser-induced plasma tool 40 include downhole unit 90, laser head 100, laser beam generator 200, beam transformer 300, acoustic mirror 400, sensors 500, and control system 600.

Downhole unit 90 is configured to generate a laser beam and to direct the laser beam to points within the wellbore. To this end, downhole unit 90 is configured for positioning within a wellbore, such as wellbore 10. In this example, wellbore 10 is surrounded by a rock formation wall 20 and is at least partially filled with a fluid, such as wellbore fluid. Downhole unit 90 can be deployed using any method, such as wireline intervention. Wireline intervention may include lowering the downhole tool suspended from a wire into the well.

Tool 40 includes laser head 100. In some implementations, laser head 100 includes a casing, such as an insulation box, to house various components of the laser head and to protect the components from environmental conditions frequently encountered downhole. Examples of such components may include optical or electronic components. In general, downhole unit 90 and laser head 100 can be made of any type of material that is resistant to the temperatures, pressures, and vibrations that may be experienced within a wellbore, and that can protect against fluids, dust, and debris within the wellbore.

Tool 40 includes laser beam generator 200 for generating one or more laser beams. In some implementations, laser beam generator 200 can be any type of laser configured to output a laser beam at a minimum loss. The wavelength of a laser beam may be set so that application of the laser beam to a wellbore fluid in a hydrocarbon-bearing formation produces plasma. For example, the wavelength may correspond to a resonant frequency of a fluid molecule, or a harmonic of that resonant frequency. In some implementations, the wavelength may be between 950 nanometers (nm) and 1000 nm. In some implementations, the wavelength may be between 960 nm and 980 nm. In some implementations, the wavelength is set to a principal resonant frequency of water. In some implementations, laser beam generator 200 may be integrated in the downhole unit 90. There, laser beam generator 200 may be connected to a power source. The power source may be at the surface outside the well and may be connected to laser beam generator 200 via an electrical cable or fiber optic cable 210. In some implementations, laser beam generator 200 may be integrated in laser head 100, as shown in FIG. 1A. In some implementations, laser beam generator 200 is external to the downhole unit. For example, laser beam generator 200 may be at the surface outside of the well.

FIG. 1B shows an implementations in which laser beam generator 200 is external to the tool. In this implementation, fiber optic cable 211 connects laser beam generator 200 and laser head 100 in downhole unit 90. The fiber optic cable can be used to conduct a laser beam to laser head 100. In some implementations, fiber optic cables 210 or 211 can include multiple fibers and may be connected to other components of the tool 40 via one or more fiber optic couplers, such as fiber optic coupler 212 of FIG. 1B. In some implementations, a laser beam exiting laser beam generator 200 may be split and transmitted using multiple fibers, for example, to eliminate nonlinear stimulated scattering processes, which can burn an optical fiber. In some implementations, fiber optic cables 210 or 211 can also be used to conduct other forms of energy or signals, for example, for communication of sensor data or control signals between components of tool 40.

In some implementations, tool 40 includes multiple laser beam generators 200. In some implementations, one or more laser beam generators 200 are external to the tool, each of which is connected to laser head 100 through a fiber optic cable 211. A system including multiple laser beam generators may have several advantages: combinations of different laser beams can be generated, which can provide for different operational modes and applications. In an example implementation, a first laser beam may have a property, for example, a frequency, that allows the first laser beam to traverse water without absorption, but that causes the first laser beam to be absorbed by rock. A second laser beam may have a property, for example a frequency, that causes the second laser beam to be absorbed by water. In some implementations, the second laser beam may have a wavelength, power, or mode of operation (continuous wave or pulsed) that is different from the wavelength, power, or mode of operation (continuous wave or pulsed) of the first laser beam. The first and second laser beams may be deployed concurrently, in succession, or in alteration to achieve a combined effect. In some implementations, the first laser beam may be used to create plasma in a fluid, and the second laser beam may be used to heat rock. Heating rock may cause a rock formation to weaken, making it more susceptible to mechanical damage, for example, damage caused by a shock wave in an adjacent fluid. A combined approach using two laser beams may accelerate breakage or removal of rock compared to using only the first or the second laser beam alone.

Example tool 40 also includes a power converter 213. An example power converter includes photodiodes that absorb part of a high-power laser beam and transform the laser beam into electric energy. A high-power laser beam may include a laser beam having an average optical power output of more than 1 kilowatt (kW) or having a power density of approximately $10^9$ to $10^{15}$ watts per centimeter-squared ($W/cm^2$). The electric energy may be used to power one or more components of the downhole unit 90, such as telecommunication devices 214 or control system 600. In some implementations, power converter 213 is connected to one or more fiber optic cables 211 via one or more fiber optic couplers 212. Example tool 40 can include one or more laser-based telecommunication devices 214 that can be connected to fiber optic cables 210 or 211 to receive, to transmit, to convert, or otherwise to manipulate optical signals for communication. Such laser-based telecommunication devices may operate using low-power laser beams, for example, laser beams having an optical power output of less than 1 W. For example, telecommunication device 214 may receive electrical or optical signals from one or more sensors 500. Telecommunication device 214 may convert or transmit the signals to a processing unit on the surface outside the wellbore or to control system 600.

Downhole unit 90 includes a beam transformer 300 to manipulate one or more laser beams. In some implementations, beam transformer 300 is included in laser head 100. In some implementations, beam transformer 300 includes or is connected to a coupling collimator 301. Coupling collimator 301 is configured to receive and to direct a laser beam either directly from laser beam generator 200 or from a fiber optic cable, such as fiber optic cable 211, to one or more optical elements 302. Beam transformer 300 may include one or more optical elements 302 to manipulate a profile, a direction, or a spatial-temporal distribution of a laser beam. In some implementations, one or more optical elements 302 are configured to transform, to diffract, to delay, to focus, to defocus, to orient, to divide, to recombine, to direct, or to scan one or more laser beams in order to direct the one or more laser beams to a location, such as to a wellbore fluid. Examples of optical elements may include static or deformable mirrors, static and dynamic diffractive optics, refractive optics, optical lenses, interference filters, polarizers, beam splitters, photonic crystals, or refractive index maps. In some implementations, a refractive index map may be produced from one or more photonic crystals that include periodic optical nanostructures that affect laser beam propagation. In some implementations, a refractive index map may be produced from one or more photonic crystals that are or include elements for micro-controlling the refractive index distribution in the 3D volume of the crystal. Such elements can be used to vary the refractive index of a crystal in time or space, or both, in order to obtain different diffractive patterns of a laser beam. In some implementations, elements for micro-controlling the refractive index distribution include materials that exhibit photo-refractive or electron-refractive properties, such as materials whose refractive indices can be temporarily or permanently altered by modulating light or electric currents entering the material. In some implementations, the refractive index of a crystal may be modulated by up to 50 percent depending on energy or energy density of the laser beam entering the crystal.

Optical elements 302 can be connected to a control unit, such as a processing unit or control system 600. The control unit may be on the surface outside the wellbore. The control unit is configured to control laser beam manipulation. In an example implementation, an optical element 302 is, includes, or is connected to a photonic crystal. The photonic crystal may be subjected to irradiation by one or more low-power laser beams, such as a beam extracted from a high-power laser beam or an electron beam to modulate the refractive index of the crystal. The photonic crystal can be connected to the control unit to control modulation of the refractive index of the crystal in order to diffract or to focus the laser beam.

Example tool 40 includes one or more acoustic mirrors 400 to manipulate one or more waves generated within the wellbore fluid. In some implementations, an acoustic mirror 400 includes one or more mechanical devices 402 that may cause deformation of one or more surfaces of the acoustic mirror. Examples of mechanical devices include hydraulic or pneumatic devices that can bend, twist, stretch, indent, or otherwise cause deformation of an external or internal surface, or both, of a deformable acoustic mirror. This deformation affects acoustic properties of the acoustic mirror. In some implementations, the mechanical devices 402 are connected to a control system 600, for example, to control position or configuration of the acoustic mirrors 400. In some implementations, acoustic mirrors 400 may be telescopic or deformable conic (parabolic, elliptic, or hyperbolic) acoustic mirrors. In some implementations, deformable or otherwise controllable acoustic mirrors may be controlled in real-time, for example, by an operator. In some implementations, acoustic mirrors 400 and rock formation wall 20 form the bounds of a cavity 401. Examples of waves generated in the wellbore fluid include acoustic waves or shock waves generated from one or more laser-induced plasma bubbles.

In some implementations, downhole unit 90 includes one or more pumping devices 403 to provide a confining or acoustic coupling fluid into cavity 401. A coupling fluid can be a controllable-density fluid used to enhance coupling between a pressure shock wave generated in fluid and rock formation wall 20. A coupling fluid can be a controllable-density fluid used to provide a confining media for plasma generated in fluid. In some implementations, the acoustic mirrors can be used to focus to a particular location one or more acoustic waves, such as a shock wave.

In some implementations, downhole unit 90 includes one or more sensors 500. The sensors may be used to characterize plasma generated by a laser beam or to measure pressure or temperature of one or more shock waves generated by tool 40. In some implementations, sensors 500 include one or more of the following: a temperature sensor, a pressure sensor, a viscosity sensor, a flow meter, or an optical camera. In some implementations, a sensor 500 is or includes a Raman spectrometer to provide analysis of a coupling fluid or wellbore fluid. A Raman spectrometer is a device that relies on inelastic scattering of monochromatic laser light to obtain information about vibrational modes in a system. In some implementations, sensors 500 are positioned on an exterior or interior of downhole unit 90. In some implementations, sensors 500 are positioned on acoustic mirror 400. Sensors 500 may be located on or near a surface of acoustic mirror 400 that is facing cavity 401. Sensors 500 may be located on or near a surface or portion of acoustic mirror 400 that is facing downhole unit 90 or is in contact with downhole unit 90.

In some implementations, control system 600 is downhole. In some implementation, control system 600 includes one or more processing devices of a type described in this specification. Control system 600 may be connected to one or more dynamic optical elements 302 to control orientation of one or more laser beams emitted from the optical elements. In some implementations, control system 600 is connected to sensors 500 to receive data from the sensors, to analyze data, or to transmit the data or the analyzed data to another component of tool 40. The other component may be, for example, a processing unit on the surface outside the wellbore.

In some implementations, one or more components of downhole unit 90 may be covered with shock-absorbing material to protect the unit from potentially damaging effects of a shock wave. In some implementations, the shock-absorbing material is or includes an acoustic metamaterial, which may include phononic crystals. Phononic crystals are synthetic materials that are formed by periodic variation of the acoustic properties of the material.

An implementation of downhole unit 90 is shown in FIGS. 2A and 2B. In this example implementation, high-power laser beam generator 200 can be at the surface outside of the wellbore. One or more laser beams 290 may be transmitted to laser head 100 via one or more fiber optic cables 210. Example tool 40 may include multiple fiber optic cables 210, each of which may include multiple optical fibers. In some implementations, downhole unit 90 includes one or more optical elements 220, such as one or more lenses, optical couplers, or collimators, to combine, to collimate, or to direct laser beam 290 prior to entering laser head 100. In some implementations, laser head 100 is configured for axial rotation relative to downhole unit 90 to target different locations in a wellbore. The axial rotation may be implemented using a rotational assembly 102. In some implementations, rotational assembly 102 includes one or more motors and processors that can be connected to a processing unit on the surface outside of the wellbore to enable operator control over an orientation of the laser head 100. Orientation of downhole unit 90 can be gauged via fiber-based or photonic-based gyroscopes 91.

In some implementations, laser head 100 is configured to receive laser beam 290 through one or more cover lenses or filters 221. Optical elements 220 or cover lenses or filters 221 can be mounted on an adjustable frame 230. Adjustable frame 230 may be a height-adjustable frame. Example laser head 100 includes a beam transformer 300 containing optical element 302. Optical element 302 may include directional micro-electro mechanical systems (MEMS) or deformable mirrors to direct and to focus the laser beam 290 on a target or focus spot. Laser head 100 may include a purging assembly 190, such as a gas/fluid or purging knife, to protect the laser head 100 from debris. A purging knife includes small jets injecting a purging fluid into fluid surrounding downhole unit 90. In some implementations, one or more components of laser head 100 may be adjustable and may be manipulated during operation of the tool. In some implementations, one or more components of laser head 100 may be pre-set prior to operation and may not be manipulated during operation of the tool.

Example downhole unit 90 includes adjustable acoustic mirror 400 to redirect back-propagating or reflected acoustic/pressure waves generated from laser induced plasma towards a target location in the wellbore. In some implementations, acoustic mirror 400 can also rotate or swivel using a controllable multi-axis mounting assembly (not shown). In some implementations, a multi-axis mounting assembly can include one or more motors and processors that can be connected to a processing unit on the surface that enable an operator to control orientation of acoustic mirror 400.

Example downhole unit 90 can include one or more sensors 500. In some implementations, distributed temperature sensors 501 or pressure sensors 502 may be embedded in downhole unit 90. The sensors 500 may include point sensors measuring a condition at a single point or may include arrays of multiple sensors. The sensors may be embedded in acoustic mirror 400, for example. The temperature sensors may be configured to measure the temperature at the surface of the tool. The pressure sensors may be configured to measure the amplitude of a plasma-induced pressure shock wave.

An example fiber optic cable 210 that can be used with downhole tool 90 is shown in FIG. 3. Fiber optic cable 210 includes a single fiber or multiple fibers, which may be protected by an outer shield 222. Outer shield 222 serves as an insulator and may protect the optical fibers from harmful effects of wellbore fluids, pressure, and temperature. In some implementations, outer shield 222 can be flexible and allow the cable to bend during operation to reach a target location in a wellbore. Example fiber optic cable 210 can include a second protection layer 223, such as a high temperature-high pressure insulation pipe, to reduce mechanical or temperature stress on the cable or fiber. Example fiber optic cable 210 can also include a mesh layer 224 to protect the optical fiber.

Figure 4:
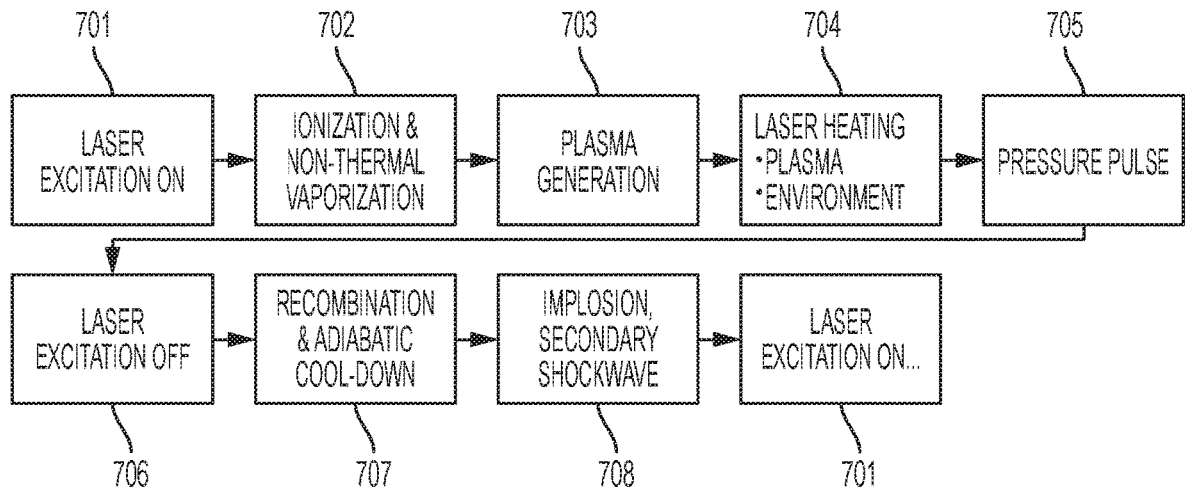
FIG. 4 is a flow diagram of an example process for inducing shock waves in a rock formation using beams produced by the laser-induced plasma tool.

FIG. 4 shows a flow diagram showing an example operation of tool 40. In operation, an example laser-induced plasma tool 40 is configured to generate one or more shock waves in a fluid in a wellbore. When a short-pulsed (for example, <1 picosecond (ps)) and high-energy (for example, $10^9$ W/cm$^2$) laser beam is focused on a point or set of points within a material, such as wellbore fluid or coupling fluid, the laser beam can trigger an ionization reaction that can generate a plasma. This process begins with a laser excitation pulse (701), which triggers the ionization and non-thermal vaporization of the medium in the illuminated area (702). This in turn generates a plasma (703) that expands as the plasma keeps absorbing energy from the laser beam (704). The expansion of the plasma results in a pressure pulse (705), for example, a shock wave—which may be a primary shock wave—that propagates outwardly normal to the plasma's surface. The plasma and pressure shock wave properties are based on parameters of the laser beam that produced the plasma and shock wave.

The amplitude of the pressure pulse, P, is related to the laser pulse energy, I, as given in Equation 1:

$$P(I) = 1 \times 10^{-2} \sqrt{\frac{\alpha \cdot Z \cdot I}{2\alpha + 3}} \qquad (1)$$

where α is the fraction of internal energy converted to thermal energy (~0.25), and Z is the impedance of the rock material. Accordingly, the peak pressure is directly proportional to the square root of the peak laser beam energy.

After completion of the pulse, when the laser pulse is off (706), the plasma quickly cools down adiabatically and a recombination process takes place (707). In the recombination (or de-ionization) process, positive ions of a plasma capture a free (energetic) electron and combine with electrons or negative ions to form new neutral atoms in the form of a gas. In some conditions, the resulting plasma collapse can be violent enough to generate another shock wave, such as secondary shock wave (708). Once the plasma fades, the shock wave continues to propagate through the formation creating fractures in the rock or providing energy to the formation fluids. The process can be repeated, starting again with laser excitation of wellbore fluid or coupling fluid (701). In some implementations, the example tool 40 can be used to create fractures and to stimulate the formation with a degree of precision while reducing damage to surrounding formation.

Generally, a shock wave can be generated inside cavity 401 at a distance from rock formation wall 20 or on a fluid-rock interface or even inside the rock. The process can be repeated any number of times in succession in any target location. It is possible to manipulate the laser beam 290, for example, to generate multiple plasma-pulses at different times and different spatial locations. In some implementations, this can provide the ability to create an amplified pressure pulse or a train of pulses for multiple applications.

Figure 5:
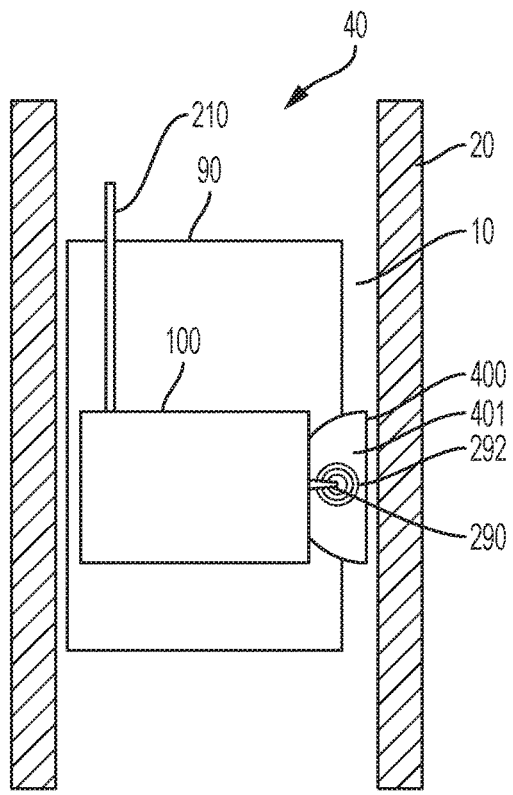
FIG. 5 is a cross-sectional view of an example laser-induced plasma tool configured to produce shock waves within a rock formation.

FIGS. 5 to 9 illustrate applications of example tool 40 inside wellbore 10. FIG. 5 illustrates generation of a plasma shock wave 292 inside of cavity 401 at a distance from a surface of rock formation wall 20 using acoustic mirror 400. In some implementations, the location of the focal point of laser 290 and configuration of mirror 400 may be chosen to allow focusing of the shock wave. In some implementations, mirror 400 is conical or has a conical portion. In this implementation, the mirror can be used to focus, to amplify, or to direct a reflected shock wave to one or more points on rock formation wall 20.

Figure 6:
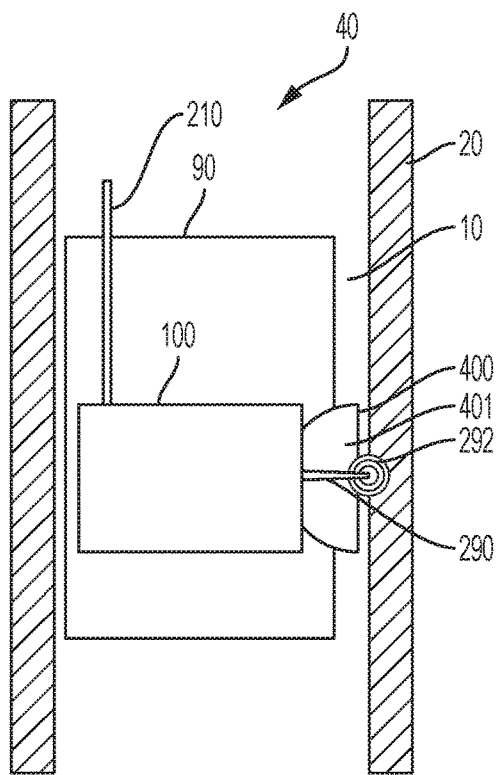
FIG. 6 is a cross-sectional view of an example laser-induced plasma tool configured to produce shock waves within a rock formation.

FIG. 6 illustrates generation of a plasma shock wave 292 inside of cavity 401. In this case, the wellbore fluid or coupling fluid may act as confining media as the process generates a high-pressure plasma made of the ejected vaporized rock. Similar to the process in FIG. 5, the ionized rock vapor can generate a plasma, which can give rise to a divergent shock wave that propagates into wellbore fluid or coupling fluid and the rock formation wall 20 at distinct velocities. After the laser pulse ceases, the recombination process takes place and a fast-paced expansion exerts mechanical momentum on the surrounding material, potentially leading to fracture or other modification of rock. Thus, plasma shock wave 292 may be or include two pressure waves. These pressure waves my include one or more pressure waves that propagate through the rock formation and another pressure wave in the confining fluid, such as a coupling fluid or wellbore fluid. Mirrors 400 can refocus the hydraulic shock wave in the formation, for example, to enhance perforation/fracturing efficiency.

Figure 7:
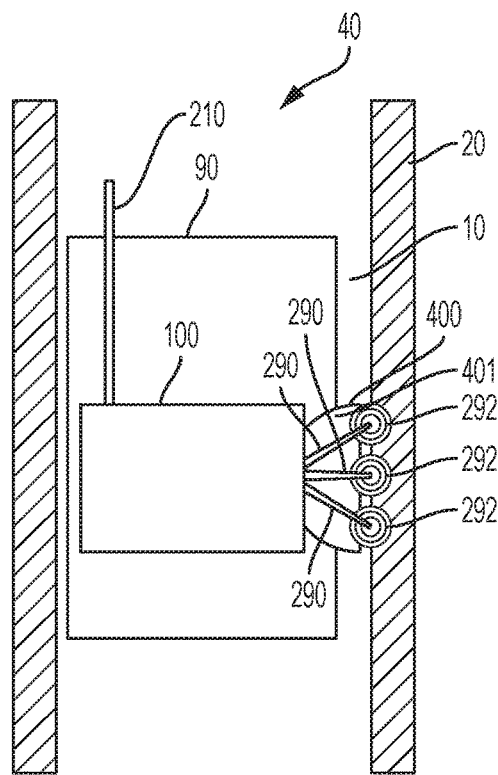
FIG. 7 is a cross-sectional view of an example laser-induced plasma tool configured to produce shock waves within a rock formation.

FIG. 7 illustrates generation of multiple plasma shock waves 292 inside of cavity 401. In this example, shock waves 292 are formed using acoustic mirror 400 and are directed at one or more points on a surface of rock formation wall 20. In this example, an optical beam transformer can be used to divide and to direct high-power laser beam 290 to multiple points on the surface of rock formation wall 20. In an example, the laser beam may be directed to three points on the surface of rock formation wall 20. The laser beam induces a plasma pulse and pressure shock wave 292 at each point. These plasma pulse and pressure shock wave may be triggered at different times in some implementations. Directing a laser beam using an optical beam transformer rather than directing a beam by moving the tool or one of its components may have the advantage of avoiding mechanical strain and thus potential damage to the tool.

Figure 8:
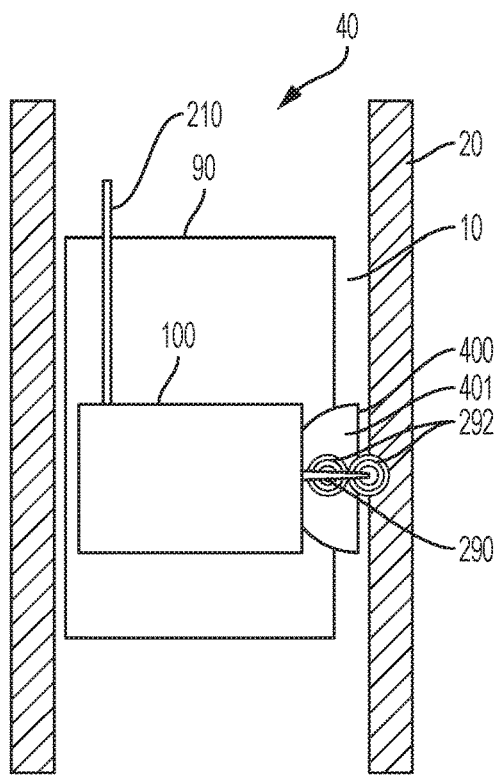
FIG. 8 is a cross-sectional view of an example laser-induced plasma tool configured to produce shock waves within a rock formation.

FIG. 8 illustrates generation of multiple plasma shock waves 292 inside of cavity 401. In this example, shock waves 292 are formed using acoustic mirror 400 inside of cavity 401. The shock waves may be formed (a) at a distance from a surface of rock formation wall 20, (b) at one or more points on a surface of rock formation wall 20, or both (a) and (b). An optical beam transformer can be used to divide and to direct the high-power laser beam 290 to two or more points on the surface of rock formation wall 20 or a confining fluid, such as a coupling fluid or wellbore fluid. Two or more laser beams can also be triggered at different times to produce a shock wave pulse train through a medium.

Figure 9:
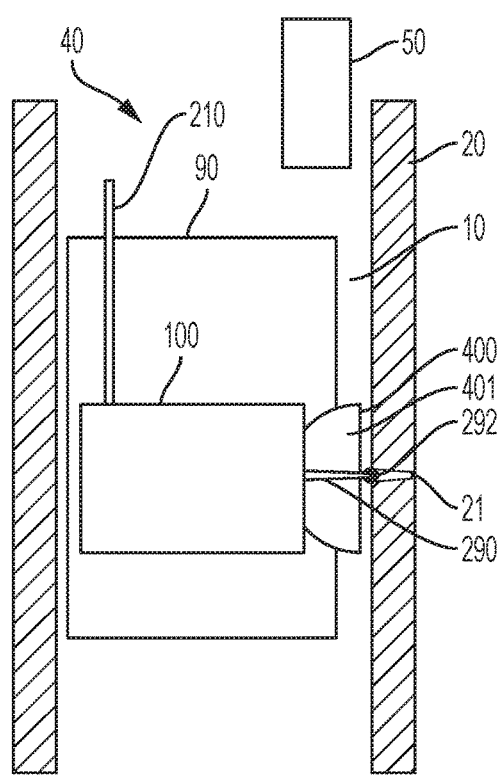
FIG. 9 is a cross-sectional view of an example laser-induced plasma tool configured to produce shock waves within a rock formation.

FIG. 9 illustrates generation of plasma shock waves 292 inside a crack or other opening 21 in rock formation wall 20. In an example implementation, a fluid, such as acid or water, is injected under high pressure into the formation via an injection tool 50, such as a coil tubing or a fishing tool. An optical beam transformer can be used to focus beam 290 on one or more points in the fluid in opening 21. Beam 290 produces shock waves that assist the fluid in the production of fractures in a rock formation, such as rock formation wall 20.

The example tools described in this specification can be used in various applications. In some implementations, the example tools may be used for fracturing, such as hydraulic fracturing. For example, as described previously, a pressure shock wave 292 can be generated on the surface of the rock formation wall 20, in a coupling fluid or in wellbore fluid inside of cavity 401 at a distance from a surface of rock formation wall 20. The primary shock wave 292 and secondary shock waves can propagate through the rock to induce a strain pulse that fractures rock in the formation.

In some implementations, the example tools may be used for photo-acidizing. Plasma can be generated in a fluid in the wellbore that includes one or more acids to dissolve or otherwise to damage rock. Plasma may be generated near the acid-rock interface, for example, on or near the surface of the rock formation wall 20. This energizes the fluid and creates micro-fractures in the rock to provide penetration channels for the acidic fluid.

In some implementations, the example tools may be used for photo-hydraulic fracturing. Similar to photo-acidizing, photo-hydraulic fracturing uses a laser beam, such as laser beam 290, to generate a plasma pulse or a shock wave 292 in a hydraulic medium, such as water, acid, or wellbore fluids. The plasma pulse or shock wave is generated near a rock formation or at an interface between the hydraulic medium and the rock, for example, at the surface of the rock formation wall 20. The pressure shock wave 292 in the hydraulic medium can propagate through the hydraulic medium and couple to the rock. The shock wave induces fractures due to the tensile strain generated by the impact of shock wave 292.

In some implementations, the example tools may be used for wellbore cleaning. For example, plasma may be generated on the surface of rock formation wall 20 so that the expanding shock wave 292, alone or in combination with a purging system, causes break up of material build-up on a surface of rock formation wall 20. In some implementations, the broken-up material can be removed using a purging or suction system, for example.

In some implementations, the example tools may be used for plasma-induced channel perforation. Plasma-induced channel perforation includes hydraulic fracturing techniques, photo-hydraulic fracturing techniques, or both, to create or to assist in the generation of perforation channels.

In some implementations, the example tools may be used for viscosity reduction. In viscosity reduction, plasma can be generated on or near the surface of rock formation wall 20, for example. A pressure shock wave 292 can propagate through the rock formation and part of its energy may be absorbed by fluids, such as hydrocarbons, in the rock formation. This absorption of energy may decrease the viscosity of the fluids, thus allowing the fluids to flow more readily into the wellbore.

In some implementations, the example tools may be used for imaging. For example, downhole unit 90 can include, be connected to, or be used in combination with, pressure, seismic, or distributed fiber optic sensors to detect or to monitor shock waves generated in the rock or fluid. In some implementations, downhole unit 90 can be used as a high-amplitude pressure source to excite a mechanical wave in a formation. The response of the media is measured by one or more distributed sensors and is used to calculate formation properties.

In the application previously described, the plasma pulses, and consequently the shock waves, can be generated at different points in space and time. Therefore, it is possible to create time and space dependent pulse patterns or trains that may overlap to generate different pressure pulse patterns.

In some implementations, one or more of the components described in this specification may be missing from the example plasma tool, one or more alternative components may be included in the example plasma tool, or one or more additional components may be substituted for one or more existing components in the example plasma tool.

At least part of the plasma tool 40 system and its various modifications may be controlled, at least in part, by a computer program product, such as a computer program tangibly embodied in one or more information formation carriers. Information carriers include one or more tangible machine-readable storage media. The computer program product may be executed by a data processing apparatus. A data processing apparatus can be a programmable processor, a computer, or multiple computers.

A computer program may be written in any form of programming language, including compiled or interpreted languages. It may be deployed in any form, including as a stand-alone program or as a module, component, subroutine, or other unit suitable for use in a computing environment. A computer program may be deployed to be executed on one computer or on multiple computers. The one computer or multiple computers can be at one site or distributed across multiple sites and interconnected by a network.

Actions associated with implementing the systems may be performed by one or more programmable processors executing one or more computer programs. All or part of the systems may be implemented as special purpose logic circuitry, for example, a field programmable gate array (FPGA) or an application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media. Machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks, for example, internal hard disks or removable disks, magneto-optical disks, compact disc read-only memory (CD-ROM), and digital versatile disc read-only memory (DVD-ROM).

Each computing device may include a hard drive for storing data and computer programs, a processing device (for example, a microprocessor), and memory (for example, random access memory (RAM)) for executing computer programs.

Components of different implementations described in this specification may be combined to form other implementations not specifically set forth in this specification. Components may be left out of such implementations described in this specification without adversely affecting their operation. In addition, the logic flows shown in, or implied by, the figures do not require the particular order shown, or sequential order, to achieve desirable results. Various separate components may be combined into one or more individual components to perform the functions described here.

What is claimed:

1. A method for stimulating a wellbore using a downhole unit configured to operate in the wellbore, the method comprising:
    introducing the downhole unit into the wellbore;
    generating one or more first laser beams;
    directing the one or more first laser beams to one or more first laser points outside the downhole unit and inside a volume of fluid at least partially confined by an acoustic mirror, the one or more first laser beams creating a plasma bubble at the one or more first laser points resulting in one or more shock waves in the volume of fluid;
    deforming the acoustic mirror to produce, from the one or more shock waves, one or more destructive reflected waves directed to one or more first target points outside of the downhole unit;
    directing the one or more first laser beams to one or more second laser points outside of the downhole unit inside a volume of fluid at least partially confined by the acoustic mirror, the one or more first laser beams creating a plasma bubble at the one or more second laser points resulting in one or more second shock waves in the volume of fluid; and
    deforming the acoustic mirror to produce, from the one or more second shock waves, one or more destructive reflected waves directed to one or more second target points outside of the downhole unit.

2. The method of claim 1, where the one or more first target points are inside the volume of fluid at least partially confined by the deformable acoustic mirror and at a distance from a wall of the wellbore.

3. The method of claim 1, where the one or more first target points are inside the volume of fluid at least partially confined by the deformable acoustic mirror and are on a fluid-rock interface on a wall of the wellbore.

4. The method of claim 1, where the one or more first target points are inside a cavity in a wall of the wellbore.

5. The method of claim 1, further comprising causing the one or more first laser beams to split to create two or more plasma bubbles at two or more first laser points resulting in two or more shock waves.

6. The method of claim 1, where directing the one or more first laser beams is performed by rotating a laser head comprising a laser beam transformer.

7. The method of claim 1, where the one or more first target points and the one or more second target points are in a same position relative to a wall of the wellbore.

8. The method of claim 7, where the one or more first target points and the one or more second target points are inside the volume of fluid at least partially confined by the acoustic mirror and at a distance from the wall of the wellbore.

9. The method of claim 1, where the one or more first target points and the one or more second target points are in different positions relative to a wall of the wellbore.

10. A method for stimulating a wellbore using a downhole unit configured to operate in the wellbore, the method comprising:
introducing the downhole unit into the wellbore;
generating one or more first laser beams;
directing the one or more first laser beams to one or more first laser points outside the downhole unit and inside a volume of fluid at least partially confined by an acoustic mirror, the one or more first laser beams creating a plasma bubble at the one or more first laser points resulting in one or more shock waves in the volume of fluid;
deforming the acoustic mirror to produce, from the one or more shock waves, one or more destructive reflected waves directed to one or more first target points outside of the downhole unit;
generating one or more second laser beams;
transmitting the one or more second laser beams to a laser beam transformer; and
directing the one or more second laser beams, using the laser beam transformer, to one or more second laser points outside of the downhole unit.

11. The method of claim 10, where the one or more second laser points are on a wall of the wellbore.

12. The method of claim 11, where the one or more second laser beams are configured to cause an increase in temperature in the wall of the wellbore.

13. The method of claim 10, where the one or more first laser beams are pulsed laser beams and the one or more second laser beams are continuous wave laser beams.

14. The method of claim 10, where the one or more first laser beams continuous wave laser beams and the one or more second laser beams are pulsed laser beams.

15. The method of claim 10, where the one or more first target points are inside the volume of fluid at least partially confined by the acoustic mirror and at a distance from a wall of the wellbore.

16. The method of claim 10, where the one or more first target points are inside the volume of fluid at least partially confined by the acoustic mirror and are on a fluid-rock interface on a wall of the wellbore.

17. The method of claim 10, where the one or more first target points are inside a cavity in a wall of the wellbore.

18. The method of claim 10, further comprising causing the one or more first laser beams to split to create two or more plasma bubbles at two or more first laser points resulting in two or more shock waves.

19. The method of claim 18, where the one or more second laser points are on a wall of the wellbore, and where the one or more second laser beams are configured to cause an increase in temperature in the wall of the wellbore.

* * * * *

UNITED STATES PATENT AND TRADEMARK OFFICE
CERTIFICATE OF CORRECTION

PATENT NO. : 10,738,579 B2  
APPLICATION NO. : 16/138525  
DATED : August 11, 2020  
INVENTOR(S) : Batarseh et al.

Page 1 of 1

It is certified that error appears in the above-identified patent and that said Letters Patent is hereby corrected as shown below:

In the Claims

In Claim 14, Column 14, Line 20, please insert -- are -- between "laser beams" and "continuous wave laser beams".

Signed and Sealed this
Twenty-ninth Day of September, 2020

Andrei Iancu
*Director of the United States Patent and Trademark Office*